(12) United States Patent
Murao et al.

(10) Patent No.: US 10,630,952 B2
(45) Date of Patent: Apr. 21, 2020

(54) IMAGE SENSOR

(71) Applicant: DENSO CORPORATION, Kariya, Aichi-pref. (JP)

(72) Inventors: Toshikazu Murao, Kariya (JP); Kazuyoshi Akiba, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 94 days.

(21) Appl. No.: 15/717,141

(22) Filed: Sep. 27, 2017

(65) Prior Publication Data
US 2018/0098040 A1 Apr. 5, 2018

(30) Foreign Application Priority Data

Oct. 3, 2016 (JP) .................. 2016-195724

(51) Int. Cl.
*H04N 9/64* (2006.01)
*G02B 5/20* (2006.01)
*H04N 5/235* (2006.01)
*H04N 5/33* (2006.01)
*H04N 9/04* (2006.01)

(52) U.S. Cl.
CPC .............. *H04N 9/646* (2013.01); *G02B 5/201* (2013.01); *G02B 5/208* (2013.01); *H04N 5/2351* (2013.01); *H04N 5/332* (2013.01); *H04N 9/045* (2013.01)

(58) Field of Classification Search
CPC ...... H04N 9/646; H04N 5/2351; H04N 5/332; H04N 9/045
See application file for complete search history.

(56) References Cited

U.S. PATENT DOCUMENTS

| | | | |
|---|---|---|---|
| 2010/0282945 A1* | 11/2010 | Yokogawa | ........ H01L 27/14621 250/208.1 |
| 2011/0102715 A1* | 5/2011 | Park | ....................... G02B 5/008 349/106 |
| 2011/0181752 A1 | 7/2011 | Nakashima | |
| 2012/0308082 A1 | 12/2012 | Murao et al. | |
| 2013/0229513 A1* | 9/2013 | Ichitani | .............. G02B 27/1066 348/135 |

(Continued)

FOREIGN PATENT DOCUMENTS

JP 2008-289000 11/2008

*Primary Examiner* — Jonathan R Messmore
(74) *Attorney, Agent, or Firm* — Knobbe, Martens, Olson & Bear, LLP

(57) ABSTRACT

An image sensor includes a plurality of optical filters, a plurality of transmissive members, an imaging section, and a signal processing section. The optical filters transmit visible rays having a wavelength enabling visual recognition of a primary color, and the transmissive members transmit infrared rays. A plurality of imaging elements of the imaging section are constituted by a plurality of groups. Each of the imaging elements includes optical filters or transmissive members. The signal processing section determines the luminance of each pixel of a produced image, based on measurement values measured by the imaging elements of a group corresponding to the pixel. At least one imaging element of each group is provided with a transmissive member, and the remaining one or more imaging elements are provided with the optical filters having no color or a primary color allocated to the group.

7 Claims, 3 Drawing Sheets

(56) References Cited

U.S. PATENT DOCUMENTS

| | | | |
|---|---|---|---|
| 2013/0250103 A1* | 9/2013 | Lu | H04N 5/2258 |
| | | | 348/143 |
| 2013/0328947 A1* | 12/2013 | Ishikawa | G09G 3/344 |
| | | | 345/690 |
| 2015/0086079 A1 | 3/2015 | Murao et al. | |
| 2015/0117715 A1 | 4/2015 | Murao et al. | |
| 2017/0134704 A1 | 5/2017 | Otsubo et al. | |
| 2017/0150071 A1 | 5/2017 | Otsubo et al. | |
| 2018/0270462 A1 | 9/2018 | Otsubo et al. | |

* cited by examiner

IMAGE SENSOR

CROSS-REFERENCE TO RELATED APPLICATION

This application is based on and claims the benefit of priority from earlier Japanese Patent Application No. 2016-195724 filed Oct. 3, 2016, the description of which is incorporated herein by reference.

BACKGROUND OF THE INVENTION

1. Technical Field of the Invention

The present disclosure relates to an image capturing technique.

2. Related Art

According to the imaging system disclosed in a patent document US2013/0250103 A1, a plurality of infrared (IR) filters are arranged in a grid pattern together with a plurality of color filters. The IR filters transmit infrared rays and block visible rays. To alleviate the influence of infrared rays, the imaging system corrects the measurement value of a visible ray obtained by an imaging element corresponding to the color filter, on the basis of a measurement value obtained by an imaging element corresponding to the IR filter. With this configuration, the imaging system can produce an image with a good quality, without being provided with a filter for blocking infrared rays.

According to the imaging system of US2013/0250103 A1, however, the plurality of IR filters are arranged together with the plurality of color filters. Accordingly, the imaging system includes a smaller number of color filters than in the case where a plurality of color filters are arranged according to a Bayer arrangement used for common image sensors. Consequently, the imaging system causes deterioration in color reproducibility of a captured image.

SUMMARY OF THE INVENTION

The present disclosure provides a technique for simplifying a hardware configuration of an image sensor, while preventing deterioration in quality of a produced image.

An image sensor which is an aspect of the technique of the present disclosure produces an image. The image sensor includes a plurality of optical filters, a plurality of transmissive members, an imaging section, and a production section.

The plurality of optical filters transmit visible rays having a wavelength enabling visual recognition of one of a plurality of primary colors, and block visible rays having different wavelengths. The plurality of transmissive members transmit at least infrared rays. The imaging section includes a plurality of imaging elements which are arranged, being two-dimensionally spread, in a state of being associated with one of the plurality of optical filters and the plurality of transmissive members. A visible ray or an infrared ray enters each of the plurality of imaging elements, the visible ray having passed through an optical filter corresponding to the imaging element concerned, the infrared ray having passed through a transmissive member corresponding to the imaging element concerned. The production section produces an image.

The plurality of imaging elements include a plurality of groups. One of the plurality of primary colors is allocated to each of the plurality of groups. The transmissive members are provided, being associated with at least one of the plurality of imaging elements belonging to a corresponding one of the groups, with the optical filters being provided so as to be associated with the remaining one or more imaging elements belonging to the group. The optical filters have no color or have a primary color allocated to the group. The optical filters transmit visible rays having a wavelength enabling visual recognition of the primary color allocated to the group.

According to the above configuration of the image sensor of the present disclosure, the plurality of imaging elements are divided into a plurality of groups, and each group is associated with a corresponding one of the pixels of the image produced by the image sensor. Each group includes one or more imaging elements corresponding to the respective optical filters having no color or having the same primary color, and at least one imaging element corresponding to the transmissive member. According to the image sensor of the present disclosure, the luminance of the pixel corresponding to each group is calculated, on the basis of the measurement values of the visible rays and the infrared rays measured by the plurality of imaging elements belonging to the group. That is, at least one imaging element provided with the transmissive member is arranged, being associated with a pixel. According to the image sensor, the luminance of each pixel is calculated by taking account of the measurement value measured by the imaging element corresponding to the transmissive member provided to the pixel.

Thus, the image sensor of the present disclosure can calculate the luminance of the primary color corresponding to each pixel, while alleviating the influence of infrared rays, without using a filter for blocking infrared rays. In this way, color reproducibility is enhanced in the color image. According to the image sensor, therefore, it is possible to simplify a hardware configuration, while preventing deterioration in quality of a produced image.

Note that reference signs in parentheses mentioned in this section and the claims indicate a correspondence with the components that will be mentioned in the embodiment described later as an aspect. Thus, the reference signs do not limit a technical scope of the present disclosure.

DETAILED DESCRIPTION OF THE PREFERRED EMBODIMENTS

With reference to accompanying drawings, an embodiment of the technique of the present disclosure will be discussed.

[1. Overall Configuration]

Figure 1:
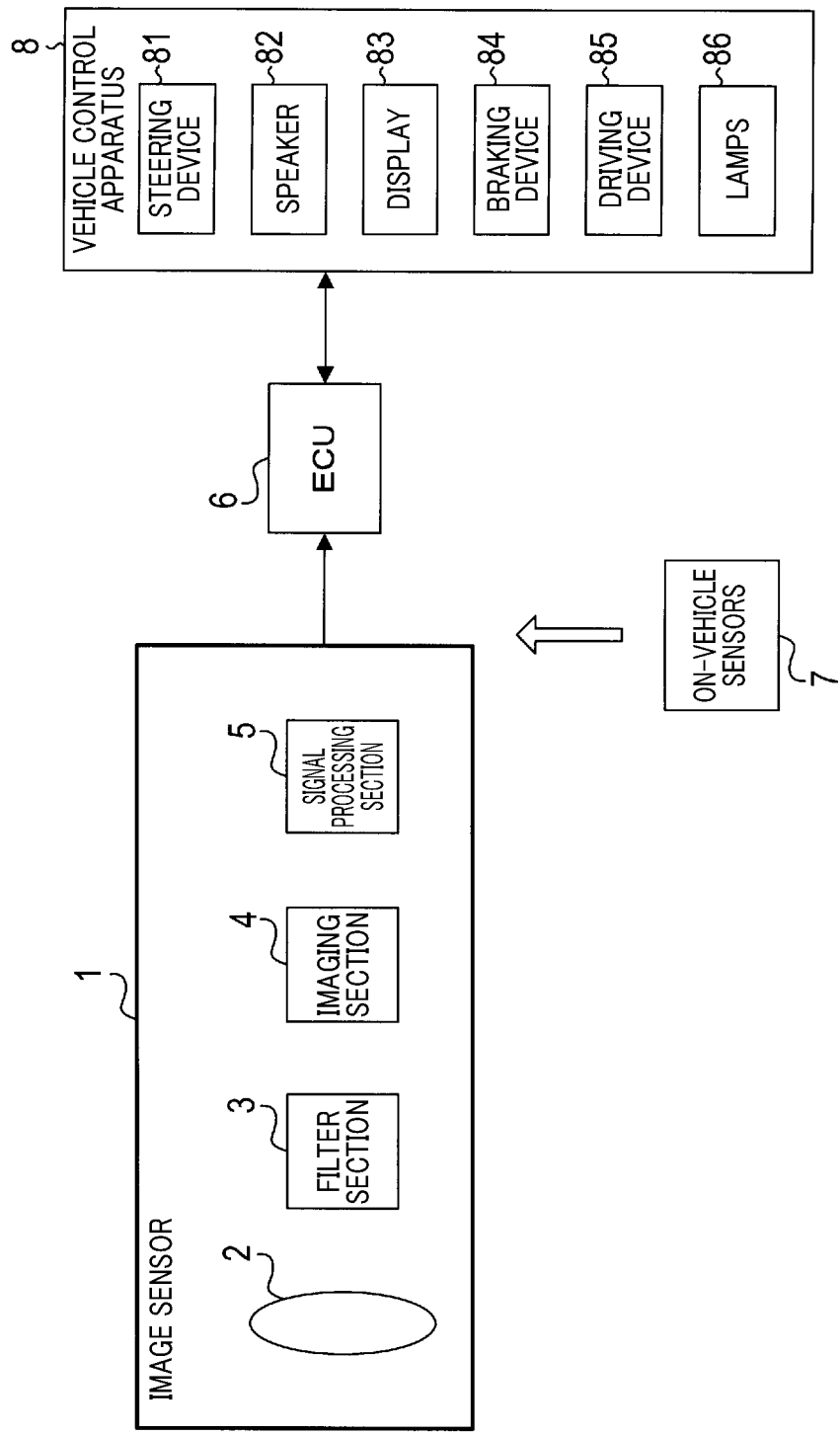
FIG. 1 is a block diagram illustrating an image sensor, an ECU, and the like, according to an embodiment of the present invention.

FIG. 1 shows an image sensor 1, an ECU 6, an on-vehicle sensor 7, and a vehicle control apparatus 8 equipped in a vehicle. Hereinafter, the vehicle equipped with these devices is referred to as the own vehicle. The ECU 6 detects various targets which are present around the own vehicle by using the image sensor 1 and other devices. The ECU 6 controls the vehicle control apparatus 8 on the basis of the result of detection, and performs various processes, for drive assist of the own vehicle.

The vehicle control apparatus 8 includes one or more devices which are installed in the own vehicle. Specifically, for example, the vehicle control apparatus 8 can include a steering device 81 such as an electric power steering, a braking device 84 such as a brake, and a driving device 85 such as an accelerator, each of which is a device for controlling the behavior of the own vehicle. Other than these devices, the vehicle control apparatus 8 can include, for example, a speaker 82, a display 83, and a lamp 86.

The devices included in the vehicle control apparatus 8 are activated according to the instructions given from the ECU 6 to provide drive assist, such as automatic driving. In the automatic driving, driving manipulations, such as acceleration, braking, and steering of the own vehicle, are automatically performed. Specifically, in the automatic driving, the own vehicle may be completely automatically permitted to cruise to its destination, or the own vehicle may be permitted to follow a preceding vehicle. Other than these ways of automatic driving, the own vehicle may be automatically manipulated in respect of only acceleration and braking, for automatic control of the speed of the own vehicle. Furthermore, in the automatic driving, the own vehicle may be automatically manipulated in respect of only steering, for automatic control of the traveling route. The devices in the vehicle control apparatus 8 can provide drive assist, such as collision avoidance, speed warning, rear-end collision warning, inter-vehicle distance warning, or lane departure warning. The collision avoidance is performed in the case where there is a possibility that the own vehicle will collide with an object. In this case, the collision with the object is avoided by performing braking control and/or steering control.

A signal from the on-vehicle sensor 7 is inputted to the image sensor 1 and/or the ECU 6. The on-vehicle sensor 7 includes one or more sensors. Specifically, the on-vehicle sensor 7 can include sensors, such as a vehicle speed sensor, various acceleration sensors, and a rudder angle sensor, which detect the behavior of the own vehicle. The on-vehicle sensor 7 can also include a sensor, such as a radar, which detects the surroundings of the own vehicle. The on-vehicle sensor 7 can also include a device, such as GPS, which outputs the position data of the own vehicle, or a device, such as a navigation device, which serves as a source of supplying map data, or a communication device (road-vehicle communication device, mobile terminal, such as smartphone), or the like.

The image sensor 1 periodically captures an image around the own vehicle and outputs image data indicating the captured image to the ECU 6. A detailed configuration of the image sensor 1 will be described later.

The ECU 6 is mainly configured, for example, by a microcomputer including at least CPU, RAM, ROM, and the like. The ROM, Which is one of non-transitory tangible recording media, stores a program for executing drive assist on the basis of the image acquired by the image sensor 1. The CPU of the ECU 6 is operated according to the program and provides drive assist mentioned above.

The image sensor 1 and the ECU 6 can detect a position, size, shape, type, state, and the like of a target which is present around the own vehicle, on the basis of the acquired captured image. Examples of the target include a vehicle, a pedestrian, various stationary objects, a traffic lane, a road sign, a traffic signal, and the like. The image sensor 1 and the ECU 6 can detect a target by using the information acquired from the on-vehicle sensor 7. The image sensor 1 can output the result of detection of a target to the ECU 6. The ECU 6 can provide drive assist on the basis of the result of detection of the target.

[2. Configuration of Image Sensor]

The image sensor 1 is configured as a monocular camera. The image sensor 1 includes a lens section 2, a filter section 3, an imaging section 4, and a signal processing section 5. In other words, the image sensor 1 includes a lens, an optical filter device, an imaging device, and a signal processing unit. The lens section 2 corresponds to one or more lenses. The filter section 3 corresponds to the optical filter device. The imaging section 4 corresponds to the imaging device. The signal processing section 5 corresponds to the signal processing unit.

Figure 2:
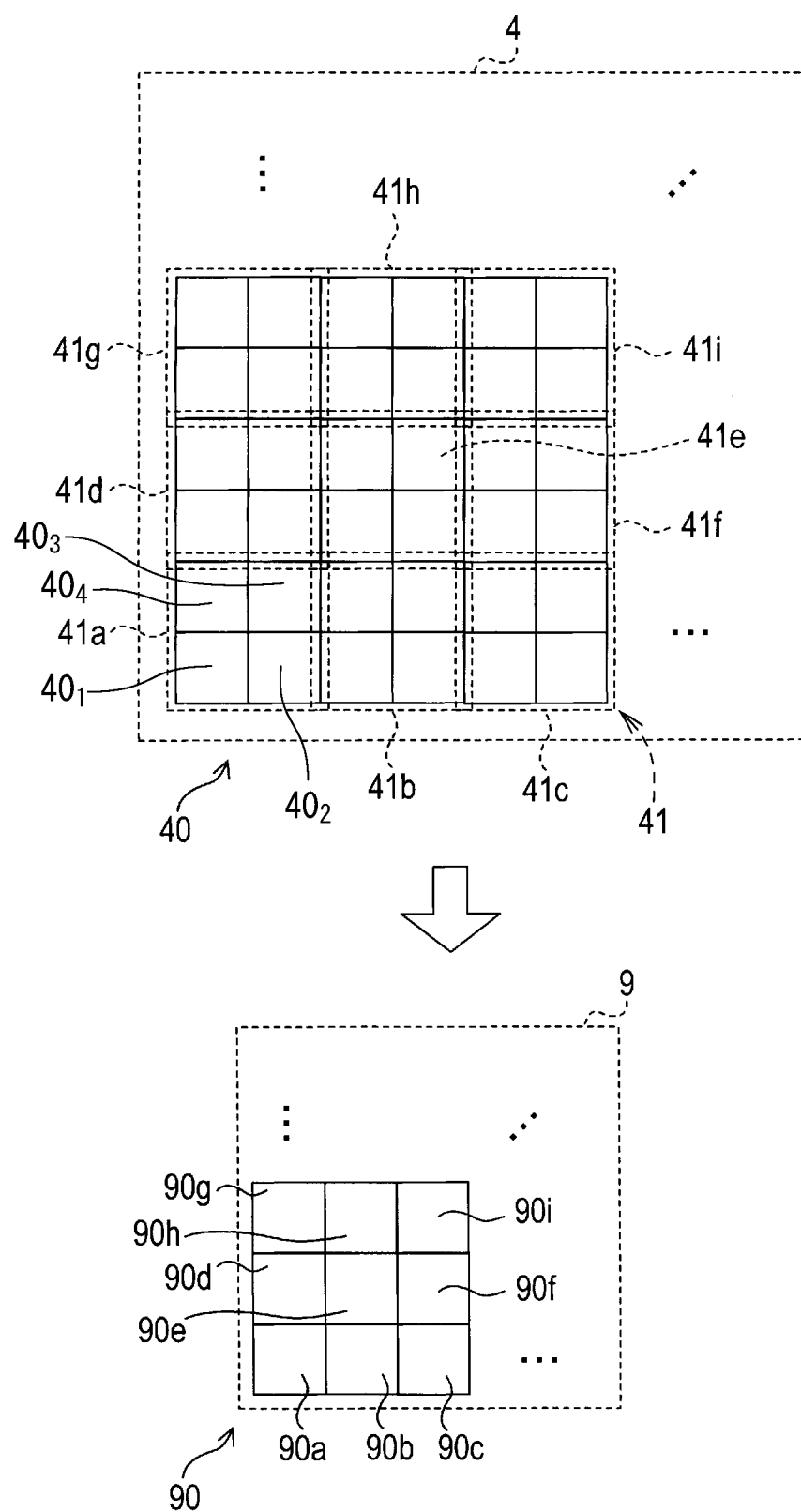
FIG. 2 is a diagram illustrating an imaging section and a captured image, according to the embodiment.

The imaging section 4 includes a plurality of imaging elements 40 (e.g., complementary metal oxide semiconductor (CMOS) sensor, charge coupled device (CCD) sensor, or the like). As shown in FIG. 2, the plurality of imaging elements 40 are arranged in a grid pattern (in an array). The plurality of imaging elements 40 are divided into a plurality of groups. That is, one imaging element 40 is a component of a group. Hereinafter, a group of imaging elements 40 is also referred to as an imaging element group 41. Each imaging element group 41 includes four imaging elements 40 arranged in a two-by-two matrix. Taking a specific example, an imaging element group 41a includes four imaging elements $40_1$ to $40_4$ as shown in FIG. 2.

The imaging section 4 includes an amplifier and an A/D converter, not amplifier amplifies an analog signal, which is outputted from each imaging element 40, at a predetermined gain. The analog signal indicates the intensity of each visible ray and infrared ray incident on the imaging element 40. The A/D converter converts the amplified analog signal into a digital value and outputs the digital value to the signal processing section 5 as a measurement value measured by the imaging element 40.

The lens section 2 includes one or more lenses. The lens section 2 forms an image of an incident visible light on the imaging elements 40 of the imaging section 4.

The signal processing section 5 produces a captured image 9 on the basis of the intensities of the visible rays and the infrared rays measured by the respective imaging elements 40. The signal processing section 5 is capable of producing a color image and a high sensitivity image. The color image is produced on the basis of the difference between the luminance of light passing through a color filter and the luminance of light passing through an IR filter, and has good color reproducibility. The color image is produced from a Bayer image in which a primary color is associated with each pixel. According to the Bayer image, each pixel outputs light of the primary color allocated to the pixel, with intensity according to the luminance of the pixel. The high sensitivity image is a highly sensitive image produced on the basis of a SUM of the luminance of light passing through the color filter and the luminance of light passing through the IR filter.

The signal processing section 5 outputs image data indicating the produced captured image 9 to the ECU 6. The signal processing section 5 can detect the position or the like of a target as mentioned above, on the basis of the captured image 9. The signal processing section 5 can output the result of detection to the ECU 6. The signal processing section 5 can include a microcomputer including at least CPU, RAM, and ROM and produce the captured image 9 using software, such as a program. Moreover, the signal processing section 5 can produce the captured image 9 using hardware such as a plurality of logic circuits.

The imaging element groups 41 correspond, on a one-to-one basis, to pixels 90 of the captured image 9 produced by the signal processing section 5. The position of each imaging element group 41 in the imaging section 4 aligns with the position of the pixel 90 corresponding to the imaging element group 41 in the captured image 9. Taking a specific example, the imaging element group 41a aligns with a pixel 90a, as shown in FIG. 2. That is, each of a plurality of imaging element groups 41a to 41i aligns with corresponding one of a plurality of pixels 90a to 90i. The luminance of each pixel 90 is calculated, for example, on the basis of the measurement values obtained from the imaging elements 40 included in the corresponding imaging element group 41.

The filter section 3 is arranged between the lens section 2 and the imaging elements 40 of the imaging section 4. Visible rays and infrared rays that have passed through the lens section 2 pass through the filter section 3 and enter the imaging elements 40. The filter section 3 includes a plurality of color filters and a plurality of transmissive members. Hereinafter, the plurality of color filters and the plurality of transmissive members are also each referred to as a filter.

The filter section 3 includes three types of color filters corresponding to respective primary colors of light, that is, red, green and blue (RGB). The color filters are a kind of optical filters. An optical filter corresponds to an optical element which transmits only the light of a specific wavelength range and does not transmit light of other wavelength ranges. The present embodiment deals with an example in which color filters as described below are used. Specifically, the filter section 3 includes R filters corresponding to red, G filters corresponding to green, and B filters corresponding to blue, as color filters. Each color filter transmits a visible ray with a wavelength enabling visual recognition of the corresponding primary color, and blocks visible rays of the other wavelengths.

The transmissive members transmit at least infrared rays. The transmissive members can be configured, for example, as infrared (IR) filters transmitting infrared rays and blocking visible rays of all wavelengths. The transmissive members may, for example, transmit visible rays of some wavelengths and infrared rays. The transmissive members do not necessarily have to have a function as optical filters. That is, the transmissive members may transmit visible rays of all wavelengths and infrared rays. Taking a specific example, each transmissive member can be configured as a frame-shaped member. The transmissive members may allow visible rays and infrared rays that have passed through the openings of the frames to directly enter the imaging elements 40.

Figure 3:
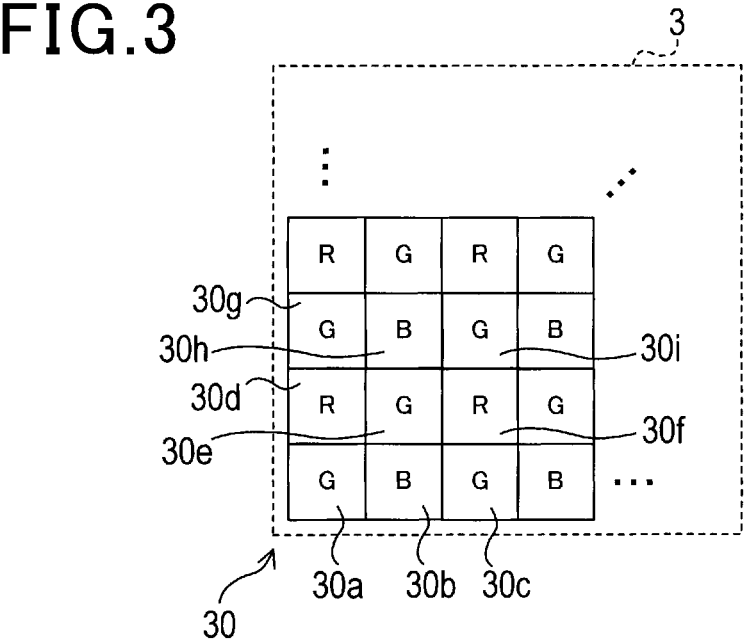
FIG. 3 is a diagram illustrating a filter section, according to the embodiment.

These filters are arranged in a grid pattern as with the plurality of imaging elements 40 of the imaging section 4. The filters correspond, on a one-to-one basis, to the plurality of imaging elements 40. The visible ray or infrared ray that has passed through each filter enters the imaging elements 40 corresponding to the filter. As shown in FIG. 3, the filters are divided into a plurality of groups. Hereinafter, a group of filters is also referred to as filter group 30. The filter groups 30 are arranged in a grid pattern. Each filter group 30 includes four filters arranged in a two-by-two matrix.

The filter groups 30 correspond to the imaging element groups 41 on a one-to-one basis. Taking a specific example, each of the plurality of filter groups 30a to 30i shown in FIG. 3 aligns with corresponding one of the plurality of imaging element groups 41a to 41i shown in FIG. 2. Four filters of a filter group 30 corresponds to the respective imaging elements 40 of the imaging element group 41 which corresponds to the filter group 30 concerned.

One of primary colors of light, that is, red (R), green (G) or blue (B), is allocated to each imaging element group 41 corresponding to the filter group 30 concerned. Hereinafter, a filter group 30 to which red is allocated is also referred to as an R group. A filter group 30 to which green is allocated is also referred to as a G group. A filter group 30 to which blue is allocated is also referred to as a B group. In the filter section 3 shown in FIG. 3, for example, the filter groups 30d and 30f correspond to the R groups. The filter groups 30a, 30c, 30e, 30g, and 30i correspond to the G groups. The filter groups 30b and 30h correspond to the B groups.

In the filter section 3, four filter groups 30 arranged in a two-by-two matrix of a predetermined pattern are repeatedly arranged. In the pattern, two G groups are arranged on a diagonal line and one R group and one B group are arranged on a diagonal line. The filter groups 30 can be arranged in a pattern different from this pattern.

Figure 4:
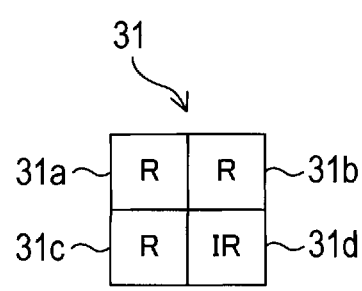
FIG. 4 is a diagram illustrating an R set which is one of filter groups, according to the embodiment.
Figure 5:
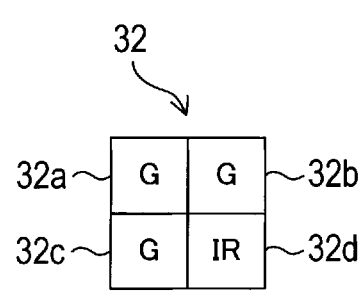
FIG. 5 is a diagram illustrating a G set which is one of filter groups, according to the embodiment.
Figure 6:
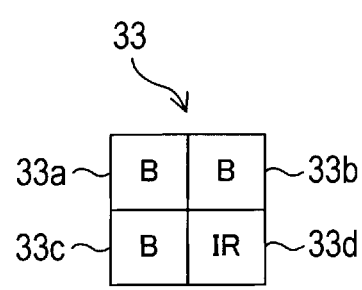
FIG. 6 is a diagram illustrating a B set which is one of filter groups, according to the embodiment.

Each filter group 30 includes one transmissive member, and three color filters transmitting a visible ray with a wavelength enabling visual recognition of the primary color allocated to the filter group 30. As shown in FIG. 4, an R group 31 includes three R filters 31a to 31c and one transmissive member 31d. As shown in FIG. 5, a G group 32 includes three G filters 32a to 32c and one transmissive member 32d. As shown in FIG. 6, a B group 33 includes three B filters 33a to 33c and one transmissive member 33d. The number of filters included in each filter group 30 and the number and position of color filters and the transmissive member are not limited to those described above and can be determined as appropriate.

The following description will discuss in detail a process for calculating the luminance value of each pixel of the captured image 9. This process is performed by the signal processing section 5.

(1) First Calculation Process

First, the following description will discuss a first calculation process for calculating the luminance value of each pixel in the case where the transmissive member is configured as an IR filter.

According to the first calculation process, when a color image is produced, red, green, and blue are used as primary colors. A pixel corresponding to the imaging element group 41 to which red is allocated is associated with a red color, a pixel corresponding to the imaging element group 41 to which green is allocated is associated with a green color, and a pixel corresponding to the imaging element group 41 to which blue is allocated is associated with a blue color. Hereinafter, the pixel corresponding to red is also referred to as an R pixel. The pixel corresponding to green is also referred to as a G pixel. The pixel corresponding to blue is also referred to as a B pixel. According to the first calculation process, a red luminance value Rr of the R pixel, a green luminance value Gg of the G pixel, and a blue luminance value Bb of the B pixel are each calculated as follows.

$$Rr = (R1 + R2 + R3) \times k1 - IRr \times 3 \times k2$$

$$Gg = (G1 + G2 + G3) \times k3 - IRg \times 3 \times k4$$

$$Bb = (B1 + B2 + B3) \times k5 - IRb \times 3 \times k6$$

R1 to R3 indicate measurement values measured by three respective imaging elements 40 which belong to each imaging element group 41 aligning with a R pixel, and correspond to the respective R filters 31a to 31c. IRr indicates a measurement value measured by one imaging element 40 which belongs to the imaging element group 41 aligning with the R pixel, and corresponds to the transmissive member 31d. G1 to G3 indicate measurement values measured by three respective imaging elements 40 which belong to each imaging element group 41 aligning with a G pixel, and correspond to the respective G filters 32a to 32c. IRg indicates a measurement value measured by one imaging element 40 which belongs to the imaging element group 41 aligning with the G pixel, and corresponds to the transmissive member 32d. B1 to B3 indicate measurement values measured by three respective imaging elements 40 which belong to each imaging element group 41 aligning with a B pixel, and correspond to the respective B filters 33a to 33c. IRb indicates a measurement value measured by one imaging element 40 which belongs to the imaging element group 41 aligning with the B pixel, and corresponds to the transmissive member 33d. In other words, IRr, IRg, and IRb indicate the measurement values of the intensities of the infrared rays measured by the imaging elements 40 corresponding to the respective transmissive members 31d to 33d. k1 to k6 are coefficients having predetermined values. Thus, when producing a color image, the signal processing section 5 calculates, for each pixel 90, the luminance of the primary color allocated to the imaging element group 41 corresponding to the pixel 90 concerned. In the calculation, the signal processing section 5 uses a value based on the measurement values of the imaging elements 40 corresponding to the color filters of the imaging element group 41 concerned, and a value based on the measurement value of the imaging element 40 corresponding to the transmissive member of the imaging element group 41 concerned. The luminance value is calculated by calculating a difference between these two values.

For each pixel, the luminance value of a different primary color not allocated to to the pixel is calculated based on the luminance values of the primary color allocated to different pixels located around the pixel concerned.

Specifically, for example, the green luminance value Gr of an R pixel is calculated based on the luminance values Gg of the G pixels located around the R pixel. The blue luminance value Br of the R pixel is calculated based on the luminance values Bb of the B pixels located around the R pixel. More specifically, the luminance value Gr of the R pixel indicates a mean value of the luminance values Gg of the G pixels around the R pixel. The luminance value Br of the R pixel indicates a mean value of the luminance values Bb of the B pixels around the R pixel.

Similarly, the red luminance value Rg of a G pixel and the blue luminance value Bg of the G pixel are calculated based on the luminance values Rr of the R pixels located around the G pixel, and the luminance values Bb of the B pixels located around the G pixel, respectively. The red luminance value Rb of a B pixel and the green luminance value Gb of the B pixel are calculated based on the luminance values Rr of the R pixels located around the B pixel, and the luminance values Gg of the G pixels located around the B pixel, respectively. Thus, when producing a color image, the signal processing section 5 calculates, for each of the plurality of pixels 90, the luminance values of the primary colors which differ from the primary color allocated to the imaging element group 41 corresponding to the pixel 90 concerned. When calculating such a luminance value of a different primary color, the signal processing section 5 uses a value based on the measurement value derived from the imaging element 40 corresponding to the transmissive member of the imaging element group 41 concerned, and a value based on the measurement values derived from the imaging elements 40 corresponding to the color filters of the imaging element group 41 concerned. The luminance values of different primary colors are each calculated by calculating a difference between the former and latter values.

Thus, according to the first calculation process, a color image can be produced in a state where the influence of infrared rays is alleviated.

According to the first calculation process, when producing a high sensitivity image, a luminance value Wr of the R pixel, a luminance value Wg of the G pixel, and a luminance value Wb of the B pixel are each calculated as follows.

$$Wr=(R1+R2+R3) \times k7-IRr \times k8$$

$$Wg=(G1+G2+G3) \times k9-IRg \times k10$$

$$Wb=(B1+B2+B3) \times k11-IRr \times k12$$

k7 to k12 are coefficients having a predetermined value. Thus, when producing a high sensitivity image, the signal processing section 5 calculates the luminance of each of the plurality of pixels 90. When calculating the luminance, the signal processing section 5 uses a value based on the measurement values of the imaging elements 40 corresponding to the color filters and belonging to the imaging element group 41 that aligns with the pixel concerned, and a value based on the measurement value of the imaging element 40 corresponding to the transmissive member and belonging to imaging element group 41. The luminance value is calculated by calculating a sum of the former and latter values. Thus, according to the first calculation process, a high sensitivity image can be produced in a state Where the result of the measurement of the infrared ray derived from the imaging element 40 is sufficiently reflected.

(2) Second Calculation Process

The following description will discuss a second calculation process for calculating a luminance value of each pixel in the case where the transmissive member transmits visible rays of all wavelengths.

According to the second calculation process, when a color image is produced, cyan (C), magenta (M), and yellow (Y) are used as primary colors. A pixel corresponding to the imaging element group 41 to which red is allocated is associated with cyan, a pixel corresponding to the imaging element group 41 to which green is allocated is associated with magenta and a pixel corresponding to the imaging element group 41 to which blue is allocated is associated with yellow. Hereinafter, the pixel corresponding to cyan is also referred to as a C pixel. The pixel corresponding to magenta is also referred to as an M pixel. The pixel corresponding to yellow is also referred to as a Y pixel. According to the second calculation process, a cyan luminance value Cc of the C pixel, a magenta luminance value Mm of the M pixel, and a yellow luminance value Yy of the Y pixel are each calculated as follows.

$$Cc=IRr \times j1-(R1+R2+R3)/(3 \times j2)$$

$$Mm=IRg \times j3-(G1+G2+G3)/(3 \times j4)$$

$$Yy=IRb \times j5-(B1+B2+B3)/(3 \times j6)$$

IRr, R1 to R3, IRg, G1 to G3, IRb, and B11 to B3 have respective meanings similar to those of the first calculation process. j1 to j6 are coefficients having predetermined values.

As with the first calculation process, for each pixel, the luminance value of a different primary color not allocated to the pixel is calculated, based on the luminance values of the primary color of different pixels located around the pixel.

Specifically, for example, the magenta luminance value Mc and the yellow luminance value Yc of a C pixel are calculated based on the corresponding magenta luminance values Mm and the corresponding yellow luminance values Yy, respectively of the pixels around the C pixel. The cyan luminance value Cm and the yellow luminance value Yin of an M pixel are calculated based on the corresponding cyan luminance values Cc and the corresponding yellow luminance values Yy, respectively, of the pixels around the M pixel. The cyan luminance value Cy and the magenta luminance value My of a Y pixel are calculated based on the corresponding cyan luminance values Cc and the corresponding magenta luminance values Mm, respectively, of the pixels around the Y pixel.

Thus, according to the second calculation process, a color image can be produced in a state where the influence of infrared rays is alleviated.

According to the second calculation process, when producing a high sensitivity image, the red luminance value Wr of the R pixel, the green luminance value Wg of the G pixel, and the blue luminance value Wb of the B pixel are calculated as with the first calculation process.

[3. Advantageous Effects]

The present embodiment described above in detail yields advantageous effects as follows.

(1) According to the image sensor 1 of the present embodiment, a plurality of imaging elements 40 are divided into a plurality of imaging element groups 41, and each of the plurality of imaging element groups 41 is associated with a corresponding one of the pixels of the captured image 9. Each imaging element group 41 includes three imaging elements 40 provided with respective color filters for an identical primary color, and one imaging element 40 corresponding to a transmissive member. According to the image sensor 1, the luminance of the pixel corresponding to an imaging element group 41 is calculated based on the measurement values of the visible rays and the infrared rays measured by the imaging elements 40 of the imaging element group 41. That is, one imaging element 40 provided with the transmissive member is provided to each pixel. According to the image sensor 1, the luminance of each pixel is calculated, taking account of the measurement value of the imaging element 40 corresponding to the transmissive member provided to the pixel concerned.

An imaging element such as CCD or CMOS inevitably senses infrared rays, in particular, near infrared rays. As a measure against this, common image sensors are configured to include a filter which blocks infrared rays, so that visible rays that have passed through the filter are incident on the imaging elements. In this regard, the image sensor 1 of the present embodiment can calculate the luminance of the primary color allocated to each pixel, while alleviating the influence of infrared rays, without using a filter for blocking infrared rays. With this configuration, color reproducibility is enhanced in the color image. The image sensor 1, therefore, can simplify the hardware configuration while preventing deter oration in quality of the captured image 9.

In a known technique, at nighttime, for example, near infrared rays are emitted from a headlight or other lights of the own vehicle, and using the reflected near infrared rays as a basis, a highly sensitive captured image 9 is produced by the image sensor. In this regard, according to the image sensor 1 of the present embodiment, each imaging element group 41 includes three imaging elements 40 provided with respective color filters, and one imaging element 40 provided with a transmissive member transmitting an infrared ray. With this configuration, sensitivity to infrared rays is reduced. Accordingly, in the case where the image sensor 1 of the present embodiment is applied to the above technique, the measurement values measured by the imaging elements 40 are prevented from reaching saturation, so that a good captured image 9 can be produced with high sensitivity.

(2) According to the first and second calculation processes of the present embodiment, when a color image is produced, the luminance of the primary color allocated to each pixel is calculated in a state where the influence of infrared rays is alleviated. With this configuration, good color reproducibility is ensured. When producing a high sensitivity image, the luminance of each pixel is calculated with high sensitivity, based on the measurement value of the infrared ray measured by the imaging element 40 corresponding to the transmissive member. This makes it possible to produce a good image with high sensitivity. The image sensor 1, therefore, can provide good quality to both the color image and the high sensitivity image.

(3) The image sensor 1 of the present embodiment is installed in vehicles. The image sensor 1 outputs a captured image 9 to the ECU 6 of the vehicle. Thus, the ECU 6 can perform various processes, based on the captured image 9 of a good quality. In particular, the processes performed by the ECU 6 may require both a color image and a high sensitivity image. In this regard, the image sensor 1 of the present embodiment produces a color image and a high sensitivity image of good quality. This allows the ECU 6 to suitably perform the processes.

(4) The ECU 6 is configured to provide drive assist. That is, a captured image 9 produced by the image sensor 1 of the present embodiment is used for drive assist. The ECU 6 can use the captured image 9 of good quality to suitably provide drive assist.

[4. Other Embodiments]

An embodiment of the present disclosure has so far been described. However, the technique of the present disclosure is not limited to the aforementioned embodiment. The technique of the present disclosure can be implemented with various modifications within the scope not departing from the spirit of the present disclosure.

(1) According to the present embodiment, the plurality of imaging elements 40 in the imaging section 4 of the image sensor 1 are arranged in a grid pattern. However, the arrangement of the plurality of imaging elements 40 is not limited to the grid pattern, but may be various two-dimensionally spread patterns. In such a case, the plurality of filters in the filter section 3 are also arranged in the same way as the plurality of imaging elements 40.

(2) According to the present embodiment, each filter group 30 in the filter section 3 of the image sensor 1 includes three color filters for an identical primary color, and one transmissive member, which are arranged in a two-by-two matrix. However, the number of color filters and transmissive members in each filter group 30, and the positions or the like of the color filters and transmissive members are not limited to those of the aforementioned embodiment.

Note, however, that the plurality of filters in each filter group 30 should be continuously arranged. In other words, each filter of a filter group 30 should be arranged adjacent to another filter of the same filter group 30. The plurality of filters in each filter group 30 are preferably arranged in a N-by-N matrix (N is an integer 2 or more). The number and positions of the plurality of imaging elements 40 in each imaging element group 41 of the imaging section 4 are determined according to the number and positions of the plurality of filters in each filter group 30.

(3) According to the present embodiment, the image sensor 1 is installed in a vehicle, and a captured image 9 acquired by the image sensor 1 is outputted to the ECU 6 and is used for the process of providing drive assist. However, how to use the captured image 9 and how to apply the image sensor 1 are not limited to these. The captured image 9 can be used for processes other than for drive assist. Furthermore, the image sensor 1 may be configured, for example, as a portable camera or as any other camera, and may be installed in devices other than vehicles.

(4) According to the present embodiment, the first and second calculation processes are described as example processes for calculating the luminance of each pixel of the captured image 9. However, the processes for calculating the luminance of each pixel are not limited to the first and second calculation processes. The luminance of each pixel can be calculated by various methods according to, for example, the characteristics of the transmissive members of transmitting visible rays or infrared rays, the number of the imaging elements 40 in each imaging element group 41, the configuration of each filter group 30, and the like.

(5) The present embodiment has described, as an example, filters in the filter section 3, three types of color filters each transmitting a visible ray having the wavelength enabling visual recognition of red, blue or green, and blocking visible rays of other wavelengths. However, filters are not limited to these. The filters only need to be optical filters transmitting a visible ray of a predetermined wavelength. Accordingly, the filter does not need to be colored but, for example, may by colorless.

(6) According to the present embodiment, a plurality of functions of a single component may be implemented by a plurality of components, or a single function of a single component may be implemented by a plurality of components. Moreover, a plurality of functions of a plurality of components may be implemented by a single component, or a single function implemented by a plurality of components may be implemented by a single component. Part of the configuration of the present embodiment may be omitted. At least part of the configuration of the present embodiment may be added to or substituted by another configuration of the present embodiment. Any aspect of the technical idea specified by the wording of the claims is an embodiment of the present disclosure.

(7) Other than the image sensor 1 described above, the technique of the present disclosure can be implemented in various forms as follows. Specifically, the technique of the present disclosure can be implemented, for example, in the forms of a system including the image sensor 1 as a component, a program for allowing a computer to function as the image sensor 1, a non-transitory tangible recording medium, such as a semiconductor memory, storing the program, and a method for producing a captured image by the image sensor 1.

[5. Correspondence to the Claims]

The signal processing section 5 of the image sensor 1 of the present embodiment corresponds to a production section. The imaging element group 41 of the imaging section 4 corresponds to a group.

What is claimed is:

1. An image sensor for producing an image comprising:
a plurality of optical filters each transmitting visible rays having a wavelength enabling visual recognition of any one of a plurality of primary colors, and blocking visible rays having a different wavelength;
a plurality of transmissive members each transmitting at least infrared rays;
an imaging section including a plurality of imaging elements arranged, being two-dimensionally spread, in a state where each of the imaging elements is associated with one of the plurality of optical filters and the plurality of transmissive members, with visible rays or infrared rays entering the respective plurality of imaging elements, the visible rays having passed through the optical filters corresponding to the respective imaging elements, the infrared rays having passed through the transmissive members corresponding to the respective plurality of imaging elements; and
a production section producing the image by dividing the plurality of imaging elements into a plurality of groups, causing each of the plurality of groups to correspond to one of a plurality of pixels included in the image, and determining a luminance of each of the plurality of pixels, based on measurement values of visible rays and infrared rays measured by the plurality of imaging elements belonging to the group corresponding to the pixel, for each pixel, a value of the luminance of a different primary color not allocated to the pixel is calculated based on values of the luminance of the primary color allocated to different pixels located around the pixel concerned, wherein:
the plurality of imaging elements include the plurality of groups;
one of the plurality of primary colors is allocated to each of the plurality of groups;
the transmissive members are provided, being associated with at least one of the plurality of imaging elements belonging to a corresponding one of the groups, with the optical filters being provided so as to be associated with the remaining one or more imaging elements belonging to the group, the optical filters having no color or having a primary color allocated to the group; and
the optical filters transmit visible rays having a wavelength enabling visual recognition of the primary color allocated to the group.

2. The image sensor according to claim 1 wherein:
the plurality of transmissive members transmit infrared rays and block visible rays;
the production section produces a color image and/or a high sensitivity image;
in response to the production section producing the color image, the production section calculates, for each of the plurality of pixels, a luminance of the primary color allocated to the group corresponding to the pixel, on the basis of a difference between a value based on measurement values measured by the imaging elements corresponding to the respective plurality of optical filters belonging to the group, and a value based on measurement values measured by the imaging elements corresponding to the transmissive members belonging to the group; and
in response to the production section producing the high sensitivity image, the production section calculates a luminance of each of the plurality of pixels, on the basis of a sum of a value based on measurement values measured by the plurality of imaging elements belonging to the group corresponding the pixel, and corresponding to the respective plurality of optical filters, and a value based on measurement values measured by the imaging elements belonging to the group, and corresponding to the transmissive members.

3. The image sensor according to claim 1 wherein:
the plurality of transmissive members transmit infrared rays and visible rays;
the production section produces a color image and/or a high sensitivity image;
in response to the production section producing the color image, the production section calculates, for each of the plurality of pixels, a luminance of a primary color different from the primary color allocated to the group corresponding to the pixel, on the basis of a difference between a value based on measurement values measured by the imaging elements corresponding to the respective plurality of optical filters belonging to the group, and a value based on measurement values measured by the imaging elements corresponding to the transmissive members belonging to the group; and
in response to the production section producing the high sensitivity image, the production section calculates a luminance of each of the plurality of pixels, on the basis of a sum of a value based on measurement values measured by the plurality of imaging elements belonging to the group corresponding the pixel, and corresponding to the respective plurality of optical filters, and a value based on measurement values measured by the imaging elements belonging to the group, and corresponding to the transmissive members.

4. The image sensor according to claim 1 wherein:
the image sensor is installed in a vehicle.

5. The image sensor according to claim 1 wherein:
the image produced by the image sensor is used for drive assist for a vehicle.

6. The image sensor according to claim 1 wherein:
for each primary color allocated to one of the plurality of groups, there is a corresponding filter group comprising three optical filters of the same primary color and one transmissive member.

7. An image sensor for producing an image comprising:
a plurality of optical filters each transmitting visible rays having a wavelength enabling visual recognition of any one of a plurality of primary colors, and blocking visible rays having a different wavelength;
a plurality of transmissive members each transmitting at least infrared rays;
an imaging section including a plurality of imaging elements arranged, being two-dimensionally spread, in a state where each of the imaging elements is associated with one of the plurality of optical filters and the plurality of transmissive members, with visible rays or infrared rays entering the respective plurality of imaging elements, the visible rays having passed through the optical filters corresponding to the respective imaging elements, the infrared rays having passed through the transmissive members corresponding to the respective plurality of imaging elements; and
a production section producing the image by dividing the plurality of imaging elements into a plurality of groups, causing each of the plurality of groups to correspond to one of a plurality of pixels included in the image, and determining a luminance of each of the plurality of pixels, based on measurement values of visible rays and infrared rays measured by the plurality of imaging elements belonging to the group corresponding to the pixel, for each primary color allocated to one of the plurality of groups, there is a corresponding filter group comprising three optical filters of the same primary color and one transmissive member, wherein:
the plurality of imaging elements include the plurality of groups;
one of the plurality of primary colors is allocated to each of the plurality of groups;
the transmissive members are provided, being associated with at least one of the plurality of imaging elements belonging to a corresponding one of the groups, with the optical filters being provided so as to be associated with the remaining one or more imaging elements belonging to the group, the optical filters having no color or having a primary color allocated to the group; and
the optical filters transmit visible rays having a wavelength enabling visual recognition of the primary color allocated to the group.

* * * * *